United States Patent
Shi et al.

(10) Patent No.: US 10,409,107 B2
(45) Date of Patent: Sep. 10, 2019

(54) SEMI-TRANSMISSIVE, SEMI-REFLECTIVE DISPLAY PANEL AND METHOD OF MANUFACTURING THE SAME AND DISPLAY DEVICE

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventors: Bo Shi, Beijing (CN); Xiaohui Wu, Beijing (CN); Junrui Zhang, Beijing (CN); Ni Jiang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

(*) Notice: Subject to any disclaimer, the term of this patent is extended or adjusted under 35 U.S.C. 154(b) by 0 days.

(21) Appl. No.: 15/705,783

(22) Filed: Sep. 15, 2017

(65) Prior Publication Data

US 2018/0203295 A1     Jul. 19, 2018

(30) Foreign Application Priority Data

Jan. 19, 2017   (CN) .......................... 2017 1 0044738

(51) Int. Cl.
*G02F 1/1335*       (2006.01)
*G02F 1/1337*       (2006.01)
(Continued)

(52) U.S. Cl.
CPC .... *G02F 1/133555* (2013.01); *G02F 1/13439* (2013.01); *G02F 1/133606* (2013.01);
(Continued)

(58) Field of Classification Search
CPC .......... G02F 1/133555; G02F 1/13439; G02F 1/133788; G02F 1/133753
(Continued)

(56) References Cited

U.S. PATENT DOCUMENTS 7,656,480 B2   2/2010   Hirai et al.
2007/0153174 A1   5/2007   Kim
(Continued)

FOREIGN PATENT DOCUMENTS

CN   1740872 A   3/2006
CN   1991503 A   7/2007
(Continued)

OTHER PUBLICATIONS

First Chinese Office Action dated Mar. 26, 2019, received for corresponding Chinese Application No. 201710044738.1.

*Primary Examiner* — Frederick B Hargrove
*Assistant Examiner* — Patricia D Reddington
(74) *Attorney, Agent, or Firm* — Kinney & Lange, P.A.

(57) ABSTRACT

There are disclosed a semi-transmissive, semi-reflective display panel, a method of manufacturing the same and a display device. The semi-transmissive, semi-reflective display panel includes a display substrate having a transmissive region and a reflective region, and an optical device. The optical device includes a first reflective portion and a second reflective portion; the first reflective portion is configured to reflect the light irradiating the reflective region of the display substrate from a backlight source to the second reflective portion; and the second reflective portion is configured to transmit the light irradiating the transmissive region of the display substrate from the backlight source and reflect the light reflected from the first reflective portion to the transmissive region of the display substrate.

19 Claims, 4 Drawing Sheets

(51) Int. Cl.
*G02F 1/1343* (2006.01)
*G02F 1/1368* (2006.01)
*G02F 1/13357* (2006.01)

(52) U.S. Cl.
CPC .......... *G02F 1/1336* (2013.01); *G02F 1/1368* (2013.01); *G02F 1/133753* (2013.01); *G02F 1/133788* (2013.01); *G02F 2001/133565* (2013.01); *G02F 2201/123* (2013.01); *G02F 2203/01* (2013.01)

(58) Field of Classification Search
USPC ........................................................ 257/72
See application file for complete search history.

(56) References Cited

U.S. PATENT DOCUMENTS

| | | | |
|---|---|---|---|
| 2010/0225857 A1 | 9/2010 | Lu et al. | |
| 2015/0029454 A1* | 1/2015 | Xie .................. | G02F 1/133784 349/128 |
| 2016/0004081 A1* | 1/2016 | Kasahara .......... | G02B 27/0101 345/633 |
| 2016/0274293 A1* | 9/2016 | He ....................... | G02F 1/1336 |
| 2016/0318448 A1* | 11/2016 | Haruyama ................ | B60R 1/04 |

FOREIGN PATENT DOCUMENTS

| | | |
|---|---|---|
| CN | 102422207 A | 4/2012 |
| CN | 204576022 U | 8/2015 |
| CN | 204695268 U | 10/2015 |
| CN | 105334554 A | 2/2016 |
| CN | 106125988 A | 11/2016 |

\* cited by examiner

SEMI-TRANSMISSIVE, SEMI-REFLECTIVE DISPLAY PANEL AND METHOD OF MANUFACTURING THE SAME AND DISPLAY DEVICE

CROSS-REFERENCE TO RELATED APPLICATION

The present application claims priority to Chinese Patent Application No. 201710044738.1, filed on Jan. 19, 2017, entitled "SEMI-TRANSMISSIVE, SEMI-REFLECTIVE DISPLAY PANEL AND METHOD OF MANUFACTURING THE SAME AND DISPLAY DEVICE", which is incorporated herein by reference in its entirety.

BACKGROUND

Technical Field

The present disclosure relates to technical field of display, and particularly to a semi-transmissive, semi-reflective display panel, a method of manufacturing the same, and a display device.

Description of the Related Art

With development of the display technology, a semi-transmissive, semi-reflective liquid crystal display panel is widely used in a mobile display apparatus such as a mobile phone, a tablet computer or the like due to its advantages such as low power consumption, good circumvent adaptability, etc.

Currently, a display region of a semi-transmissive, semi-reflective liquid crystal display panel is divided into a reflective region and a transmissive region. Under outdoor glare condition, external circumvent light is reflected by the reflective region to provide light for image displaying of the semi-transmissive, semi-reflective liquid crystal display panel. Otherwise, under condition where no external light or poor external light exists, a backlight source of the semi-transmissive, semi-reflective liquid crystal display panel emits light beam to pass through the transmissive region such that the semi-transmissive, semi-reflective liquid crystal display panel may display images.

SUMMARY

Embodiments of the present disclosure provide a semi-transmissive semi-reflective display panel, a method of manufacturing the same and a display device, which may improve brightness display performance of the semi-transmissive, semi-reflective display panel.

An aspect of the present disclosure provides a semi-transmissive, semi-reflective display panel, which includes a display substrate having a transmissive region and a reflective region, and an optical device;

wherein the semi-transmissive, semi-reflective display panel further comprise an optical device including a first reflective portion and a second reflective portion;

wherein the first reflective portion is configured to reflect the light irradiating the reflective region of the display substrate from a backlight source to the second reflective portion; and the second reflective portion is configured to transmit therethrough the light irradiating the transmissive region of the display substrate from the backlight source and reflect the light reflected from the first reflective portion to the transmissive region of the display substrate.

In an embodiment, the first reflective portion comprises a reflective film layer configured between the reflective region of the display substrate and the backlight source and the second reflective portion comprises a one-way transmissive film layer configured between the transmissive region of the display substrate and the backlight source; wherein, a reflective face of the one-way transmissive film layer faces towards the transmissive region of the display substrate and is opposite to a reflective face of the reflective film layer.

In an embodiment, the optical device includes a first light transmissive layer configured between the reflective film layer and the reflective region of the display substrate; and a second light transmissive layer configured in a region surrounded by the one-way transmissive film layer, the transmissive region of the display substrate and the reflective film layer.

In an embodiment, the optical device further comprises a third light transmissive layer configured on a transmissive light-incident face of the one-way transmissive film layer, a surface of the third light transmissive layer facing towards the backlight source being parallel to a major surface of the display substrate.

In an embodiment, the first light transmissive layer, the second light transmissive layer and the third light transmissive layer are each a light transmissive resin layer.

In an embodiment, the one-way transmissive film layer is configured to be parallel to the reflective film layer.

In an embodiment, an included angle is formed between the reflective film layer and a surface of the reflective region of the display substrate facing towards the backlight source and is ranged from 30° to 60°.

In an embodiment, the semi-transmissive, semi-reflective display panel further includes a base substrate and a thin film transistor array formed on a surface of the base substrate, an insulating layer on the thin film transistor array, and a transparent pixel electrodes on a surface of the insulating layer, wherein a part of the pixel electrode is covered by the reflective electrode such that a part of the pixel electrode that is not covered by the reflective electrode is formed as a pixel electrode transmissive region, the transmissive region is located between the pixel electrode transmissive region and the base substrate, the part of the pixel electrodes that is covered by the reflective electrodes is a pixel electrode reflective region, and a region between the pixel electrode reflective region and the based substrate is the reflective region of the display substrate.

In an embodiment, the semi-transmissive, semi-reflective display panel further includes a backlight source that includes a light source, a light guide plate and an optical film sheet.

In an aspect, there is provided a method of manufacturing the semi-transmissive, semi-reflective display panel of the above embodiments, wherein the method includes:

forming the first reflective portion on a side of the reflective region of the display substrate facing towards the backlight source, and forming the second reflective portion on a side of the transmissive region of the display substrate facing towards the backlight source, the first reflective portion and the second reflective portion together forming the optical device; wherein, the reflective portion is configured to reflect the light irradiating the reflective region of the display substrate from the backlight source to the second reflective portion; and the second reflective portion is configured to transmit therethrough the light irradiating the transmissive region of the display substrate from the backlight source and reflect the light reflected from the first reflective portion to the transmissive region of the display substrate.

In an embodiment, the step of forming the first reflective portion includes:

forming a reflective film layer on a surface of the reflective region of the display substrate facing towards the backlight source, thereby forming the first reflective portion; or forming a first light transmissive layer on a surface of the reflective region of the display substrate facing towards the backlight source and manufacturing a reflective film layer on the first light transmissive layer, thereby forming the first reflective portion.

In an embodiment, the step of forming the second reflective portion includes:

forming a second light transmissive layer on a surface of the transmissive region of the display substrate facing towards the backlight source, the second light transmissive layer joining the reflective film layer, and forming an one-way transmissive film layer on the second light transmissive layer, thereby forming the second reflective portion, a reflective face of the one-way transmissive film layer being opposite to a reflective face of the reflective film layer; or forming a second light transmissive layer on a surface of the reflective film layer, the second light transmissive layer covering a surface of the transmissive region of the display substrate facing towards the backlight source, and forming the one-way transmissive film layer on a portion of a surface of the second light transmissive layer corresponding to the transmissive region of the display substrate, thereby forming the second reflective portion, a reflective face of the one-way transmissive film layer being opposite to a reflective face of the reflective film layer.

In an embodiment, the step of forming the second reflective portion further includes:

forming a third light transmissive layer on a transmissive light-incident face of the one-way transmissive film layer, a surface of the third light transmissive layer facing towards the backlight source being parallel to a major surface of the display substrate.

In an embodiment, the one-way transmissive film layer is formed to be parallel to the reflective film layer.

In an embodiment, an included angle is formed between the reflective film layer and a surface of the reflective region of the display substrate facing towards the backlight source and is ranged from 30° to 60°.

In an aspect, there is provided a semi-transmissive, semi-reflective display device including the semi-transmissive, semi-reflective display panel as described in any of embodiments of the present disclosure.

BRIEF DESCRIPTION OF THE DRAWINGS

The drawings described herein provide further understanding of the present disclosure and constitute a portion of the present disclosure. The illustrative embodiments and their description in the present disclosure are intended to interpret the present disclosure, instead of limiting the present disclosure. In the drawings.

DETAILED DESCRIPTION

In order to ensure enough screen brightness of a semi-transmissive, semi-reflective liquid crystal display panel including a transmissive region and a reflective region, the transmissive region needs have an enough aperture opening ratio as light emitted by a backlight source is shielded by the reflective region. As such, a ratio of an area of pixels in the reflective region to a total area of the semi-transmissive, semi-reflective liquid crystal display panel is limited, such that the semi-transmissive, semi-reflective liquid crystal display panel has a relatively low reflectivity for external light, and thus has a poor screen brightness when used under outdoor glare condition. Otherwise, increasing the ratio of the area of pixels in the reflective region to the total area of the semi-transmissive so as to increase the reflectivity of the semi-transmissive, semi-reflective liquid crystal display panel will naturally cause reduced aperture opening ratio of the transmissive region, and in turn degrade the screen brightness of the reflectivity of the semi-transmissive, semi-reflective liquid crystal display panel. Thus, a conventional semi-transmissive, semi-reflective liquid crystal display panel cannot achieve good brightness display performance under glare condition due to inter-restriction between the aperture opening ratio of the transmissive region and the reflectivity of the reflective region thereof. A semi-transmissive, semi-reflective display panel and a method of manufacturing the same and a display device according to embodiments of the present disclosure will be further described in detail in conjunction with the drawings.

Figure 1:
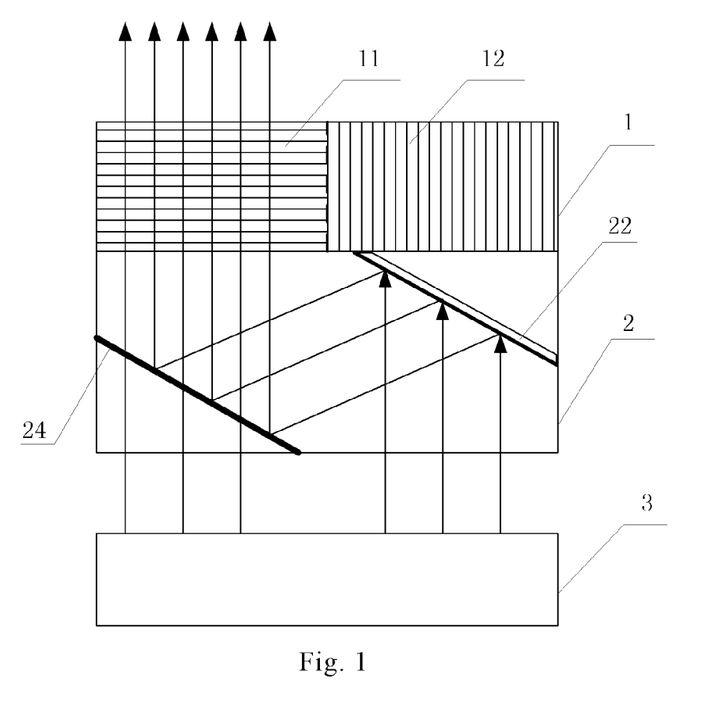
FIG. 1 is a schematic structural view of a semi-transmissive, semi-reflective display panel according to an embodiment of the present disclosure.
Figure 3:
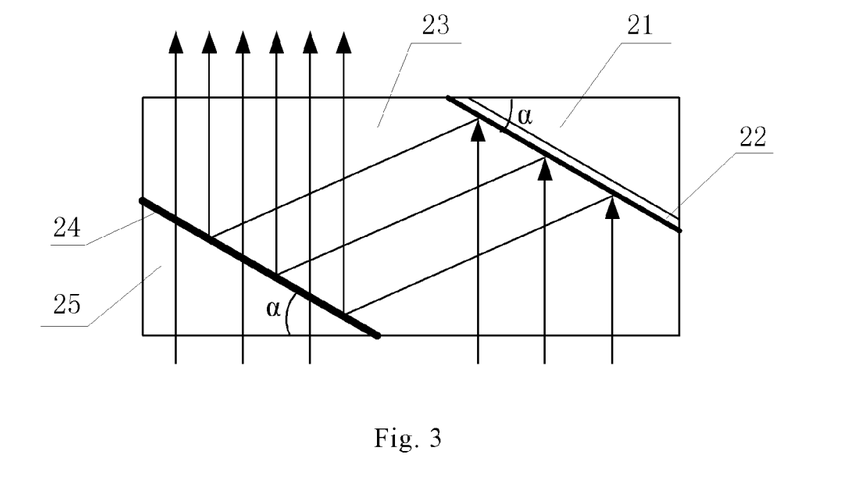
FIG. 3 is a schematic structural view of an optical device according to an embodiment of the present disclosure.

Referring to FIG. 1 and FIG. 3, a semi-transmissive, semi-reflective display panel according to an embodiment of the present disclosure includes: a display substrate 1 having a transmissive region 11 and a reflective region 12, and an optical device; the optical device includes a first reflective portion 22 and a second reflective portion 24, wherein the first reflective portion 22 is configured to reflect the light irradiating the reflective region 12 of the display substrate from a backlight source 3 to the second reflective portion 24; the second reflective portion 24 is configured to transmit the light irradiating the transmissive region 11 of the display substrate from the backlight source 3 and reflect the light reflected from the first reflective portion 22 to the transmissive region 11 of the display substrate 1.

Examples in which the first reflective portion 22 is configured to reflect the light irradiating the reflective region 12 of the display substrate from the backlight source 3 to the second reflective portion 24 include the first reflective portion 22 being located at a region between a reflective electrode of the display substrate 1 and the backlight source 3. For example, the first reflective portion 22 may be configured at a bottom surface of the reflective electrode facing towards the back light source 3, or may be configured at a bottom surface of a pixel electrode reflective region facing towards the backlight source 3, or for example, may be configured at a bottom surface of the base substrate facing towards the backlight source and corresponding to a position where the pixel electrode reflective region is located, etc.

Examples in which the second reflective portion 24 is configured to transmit the light irradiating the transmissive region 11 of the display substrate from the backlight source 3 and reflect the light reflected from the first reflective portion 22 to the transmissive region 11 of the display substrate 1 include: the second reflective portion 24 being located within a region between a portion of a pixel electrode of the display substrate 1 that is not covered by the reflective electrode and the backlight source 3. For example, the second reflective portion 24 may be configured on a bottom surface of the pixel electrode, which is not shielded by the reflective electrode and faces towards the backlight source 3, or may be located on a bottom surface of a pixel electrode transmissive region facing towards the backlight source 3, or for example may be configured on a bottom surface of the display substrate 1 facing towards the backlight source 3 and corresponding to a position where the pixel electrode transmissive region is located, etc.

In the semi-transmissive, semi-reflective display panel according an embodiment of the present disclosure, a light beam emitted from the backlight source 3 irradiates to the display substrate 1, and a first light beam from the backlight source 3 that irradiates to the transmissive region 11 of the display substrate 1 directly passes through the second reflective portion 24 to the transmissive region 11 of the display substrate 1; meanwhile, a second light beam from the backlight source 3 that irradiates to the reflective region 12 of the display substrate 1 is reflected by the first reflective portion 22 to the second reflective portion 24, and then reflected by the second reflective portion 24 to the transmissive region 11 of the display substrate 1, such that the second light beam from the backlight source 3 that irradiates to the reflective region 12 of the display substrate 1 may also be transmitted to the transmissive region 11 of the display substrate 1.

It can be known from the above description that, in the semi-transmissive, semi-reflective display panel according to the embodiment of the present disclosure, an intensity of the light outputted from the transmissive region 11 of the display substrate 1 may be increased by reflecting the second light beam from the backlight source 3 that irradiates to the reflective region 12 of the display substrate 1 such that a total light transmission of the semi-transmissive, semi-reflective display panel according to the embodiment of the present disclosure is increased and thus has enhanced screen brightness, when compared with that in prior art transflective display panel having the same aperture opening ratio in the transmissive region 11 of the display substrate 1 as the display panel according to the embodiment of the present disclosure, under irradiation of the same backlight source 2. On the other hand, for obtaining the same screen brightness as the prior art transflective display panel, the aperture opening ratio of the transmissive region 11 of the display substrate 1 of the semi-transmissive, semi-reflective display panel may be reduced moderately with relative to that in the prior art transflective display panel such that the ratio of the pixel area in the reflective region 12 of the display substrate 1 to the total area of the display substrate 1 may be moderately increased, thereby effectively increasing reflectivity of the semi-transmissive, semi-reflective display panel. Thus, compared with the prior art, the semi-transmissive, semi-reflective display panel according to the embodiment of the present disclosure may obtain effectively increased ratio of the pixel area in the reflective region 12 of the display substrate 1 to the total area of the display substrate 1, increased reflectivity of the reflective region of the display substrate, thereby improving screen brightness performance of the semi-transmissive, semi-reflective display panel.

It is noted that the display substrate 1 used in the semi-transmissive, semi-reflective display panel according to embodiments of the present disclosure may be selected from various types, such as an array substrate, or a color filter substrate, that is, the display substrate 1 may be selected regardless of its type. Each sub-pixel in the display substrate 1 includes a reflective region and a transmissive region and the reflective region and the transmissive region of each sub-pixel are obtained by covering a part of the pixel electrode in the corresponding sub-pixel by using the reflective electrode.

Figure 2:
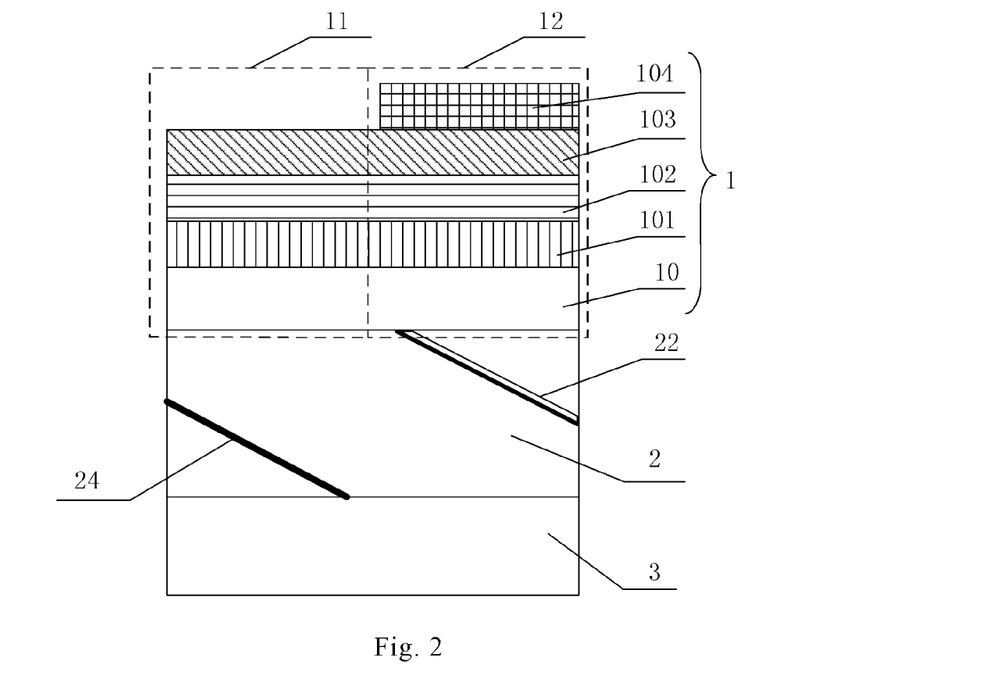
FIG. 2 is a schematic structural view of a semi-transmissive, semi-reflective display panel according to another embodiment of the present disclosure.

Exemplarily, referring to FIG. 2, in the embodiment, the display substrate 1 in the semi-transmissive, semi-reflective display panel may be an array substrate. The semi-transmissive, semi-reflective display panel according to the embodiment includes a base substrate 10, a thin film transistor array 101 formed on a surface of the base substrate 10, an insulating layer 102 on the thin film transistor array 101, and a transparent pixel electrode 103 on a surface of the insulating layer 102. In the embodiment, a part of the pixel electrode is covered by the reflective electrode 104 such that the part of the pixel electrode 103 that is not covered by the reflective electrode 104 is formed as a pixel electrode transmissive region. The region between the pixel electrode transmissive region and the base substrate 10 is the transmissive region 11, and a part of the pixel electrode 103 that is covered by the reflective electrode 104 is formed as a pixel electrode reflective region. The region between the pixel electrode reflective region and the base substrate 10 is the reflective region 12 of the display substrate 1.

In addition, the backlight source 3 used with the semi-transmissive, semi-reflective display panel according to the embodiment may be selected as a direct illumination-type backlight source or a side illumination-type backlight source. Specifically, the backlight source 3 includes a light source, a light guide plate and an optical film, of which structures and position relationship are determined by the type of the backlight source 3 and will not be limited herein.

Specifically, continuously referring to FIG. 1 and FIG. 3, the first reflective portion 22 in the above embodiment includes a reflective film layer configured between the reflective region 12 of the display substrate 1 and the backlight source 3 to reflect the second light beam from the backlight source 3, which irradiates to the reflective region 12 of the display substrate 1, to the second reflective portion 24. The specific shape and area of the reflective film layer may be chosen and determined according to the specific shape and size of the reflective region 12 of the display substrate 1. The second reflective portion 24 includes a one-way transmissive film layer configured between the transmissive region 11 of the display substrate 1 and the backlight source 3. The specific shape and area of the one-way transmissive film layer may be chosen and determined according to the specific shape and size of the transmissive region 11 of the display substrate 1.

Figure 4:
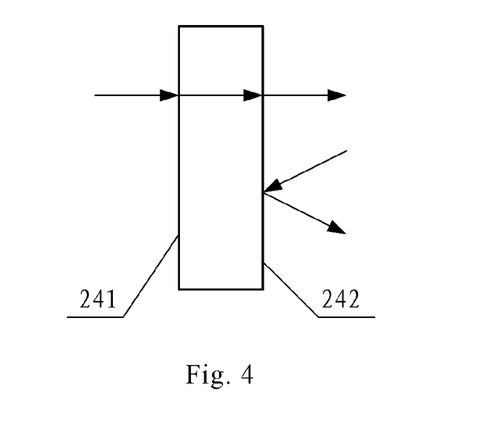
FIG. 4 illustrates optical signal propagation in a one-way transmissive film layer according to an embodiment of the present disclosure.

FIG. 4 illustrates optical signal propagation in the one-way transmissive film layer. As shown in FIG. 4, a transmissive light-incident face 241 of the one-way transmissive film layer transmits therethrough the first light beam from the backlight source 3 that irradiates to the transmissive region 11 of the display substrate 1; meanwhile, a reflective face 242 of the one-way transmissive film layer faces the transmissive region 11 of the display substrate 1 and is opposite to the reflective film layer, and is configured to reflect the second light beam that is reflected by the first reflective portion 22 to the transmissive region 11 of the display substrate 1.

In the semi-transmissive, semi-reflective display panel according to an embodiment of the present disclosure, a first light transmissive layer 21 is provided between the reflective film layer and the reflective region 12 of the display substrate 1, and a second light transmissive layer 23 is provided in a region surrounded by the one-way transmissive film layer, the transmissive region 11 of the display substrate 1 and the reflective film layer, thereby ensuring stable light propagation by reflection. Specifically, the first light transmission layer 21 is configured between the reflective film layer and a surface, facing towards the backlight source, of the reflective region 12 of the display substrate. The configuration of the reflective film layer may be determined by specifically defining the structure of the first light transmissive layer 21. As for the second light transmissive layer 23 being provided in a region surrounded by the one-way transmissive film layer, the transmissive region 11 of the display substrate 1 and the reflective film layer, in other words, the second light transmissive layer 23 is filled in the region surrounded by the one-way transmissive film layer, the transmissive region 11 of the display substrate 1 and the reflective film layer. That is, a reflective face of the one-way transmissive film layer, the surface, facing towards the backlight source 3, of the transmissive region 11 of the display substrate 1 and a reflective face of the reflective film layer are respectively joined to corresponding faces of the second light transmissive layer 23 such that the second light beam reflected by the reflective film layer, through the second light transmissive layer, propagates to the reflective face of the one-way transmissive film layer, and then is reflected by the reflective face of the one-way transmissive film layer through the second light transmissive layer to the transmissive region 11 of the display substrate 1, thereby ensuring multiple reflections of the second light beam to be stably performed in a same medium.

In order to ensure the second light beam from the backlight source 3 that irradiates to the reflective region 12 of the display substrate 1 may be reflected in a maximum amount as possible to the one-way transmissive film layer and is reflected by the one-way transmissive film layer to the transmissive region 11 of the display substrate 1, the reflective film layer and the one-way transmissive film layer may be configured and positioned such that, for example, the first light transmissive layer 21 is in a shape of a right-angle triangle, the reflective film layer is located on an inclined side surface of the first light transmissive layer 21 and a right angle face of the first light transmissive layer 21 joins the face, facing towards the backlight source 3, of the reflective region 12 of the display substrate 1, that is, such that an included angle a is formed between the reflective film layer and the face of the reflective region 12 of the display substrate that faces the backlight source 3. With this configuration, the amount of the second light beam that may be reflected by the reflective film layer to the one-way transmissive film layer is varied depending on change of the included angle a, within the limited space in the structure of the semi-transmissive, semi-reflective display panel.

In the embodiment, the included angle a may be ranged from 30° to 60°, such that the reflective film layer may reflect the second light beam as much as possible to the one-way transmissive film layer. Further, the one-way transmissive film layer is configured to be parallel to the reflective film layer such that the second light beam from the backlight source 3 that irradiates to the reflective region 12 of the display substrate 1, after being reflected dually by the reflective film layer and the one-way transmissive film layer, is propagated an incident direction towards the transmissive region 11 of the display substrate 1, which is to the same as the incident direction of the first light beam from the backlight source 3, which irradiates to the transmissive region 11 of the display substrate 1, avoiding mutual interference or weakening between the second and the first light beams caused by their different incident directions and further increasing light transmittance of the transmissive region 11 of the display substrate 1.

In order for convenience for positioning and matching of the optical device 2 with other functional layers in the semi-transmissive, semi-reflective display panel, in an embodiment, a third light transmissive layer 25 is provided on the transmissive light-incident face 241 of the one-way transmissive film and is configured such that a surface thereof, facing towards the backlight source 3, is parallel to a bottom surface of the display substrate 25, ensuring an outer surface of the optical device 2 is flat so as to facilitate arrangement of other functional layers thereon.

It is noted that, in the above embodiments, the first light transmissive layer, the second light transmissive layer and the third light transmissive layer may be made of various materials, such as transparent resin or light-transmittance glass, etc., as long as stable propagation of light may be achieved. In an embodiment, the first light transmissive layer, the second light transmissive layer and the third light transmissive layer may be all made of transparent resin. The transparent resin with high light transmission may not only facilitate manufacturing of the first light transmissive layer, the second light transmissive layer and the third light transmissive layer but also reduce light loss during propagation of the light among the first light transmissive layer, the second light transmissive layer and the third light transmissive layer.

In an embodiment of the present disclosure, the semi-transmissive, semi-reflective display panel includes an optical device 2 including a first reflective portion 22 at a side, facing towards the backlight source 3, of the reflective region 12 of the display substrate 1 and a second reflective portion 24 at a side, facing towards the backlight source 3, of the transmissive region 11 of the display substrate 1, the first reflective portion 22 and the second reflective portion 24 together forming the optical device 2; wherein the first reflective portion 22 is configured to reflect the light, from a backlight source 3, irradiating the reflective region 12 of the display substrate to the second reflective portion 24; the second reflective portion 24 is configured to transmit the light irradiating the transmissive region 11 of the display substrate from a backlight source 3 and reflect the light reflected from the first reflective portion 22 to the transmissive region 11 of the display substrate 1. The semi-transmissive, semi-reflective display panel having the above optical device 2 has an increased screen brightness with relative to an conventional one.

In the embodiment, the optical device includes the first light transmissive layer configured between the reflective film layer and the reflective region of the display substrate; and, the second light transmissive layer configured in the region surrounded by the one-way transmissive film layer, the transmissive region of the display substrate and the reflective film layer. The optical device may further include the third light transmissive layer configured on the transmissive light-incident face of the one-way transmissive film layer, and a surface of the third light transmissive layer, facing towards the backlight source, is parallel to a major surface of the display substrate.

Embodiments of the present disclosure further provide a method of manufacturing the semi-transmissive, semi-reflective display panel of the above embodiments. The method includes: forming the first reflective portion 22 on a side of the reflective region 12 of the display substrate 1 facing towards the backlight source 3, and forming the second reflective portion 24 on a side of the transmissive region 11 of the display substrate 1 facing towards the backlight source 3, the first reflective portion 22 and the second reflective portion 24 together forming the optical device 2; wherein, the reflective portion 22 is configured to reflect the light irradiating the reflective region 12 of the display substrate 1 from the backlight source 3 to the second reflective portion 24; the second reflective portion 24 is configured to transmit the light irradiating the transmissive region 11 of the display substrate 1 from the backlight source 3 and reflect the light reflected from the first reflective portion 22 to the transmissive region 11 of the display substrate 1.

Compared with the prior art, the method of manufacturing the semi-transmissive, semi-reflective display panel according to embodiments of the present disclosure may achieve the same advantageous effects as those achieved by the semi-transmissive, semi-reflective display panel according to embodiments of the present disclosure, which are not repeatedly described here.

Figure 5:
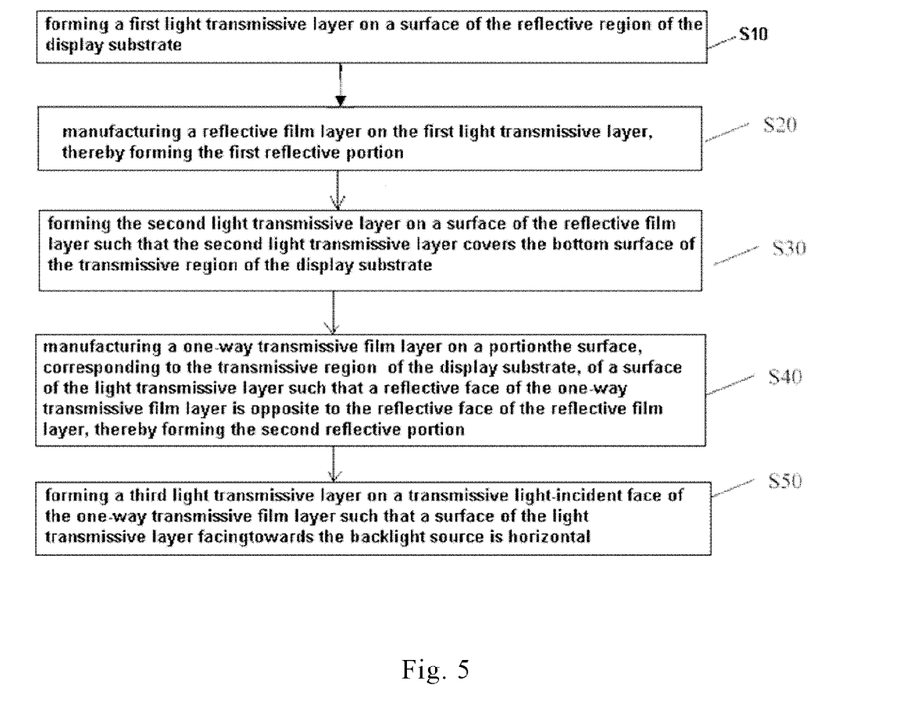
FIG. 5 is a flow chart of a method of manufacturing an optical device according to an embodiment of the present disclosure.
Figure 6:
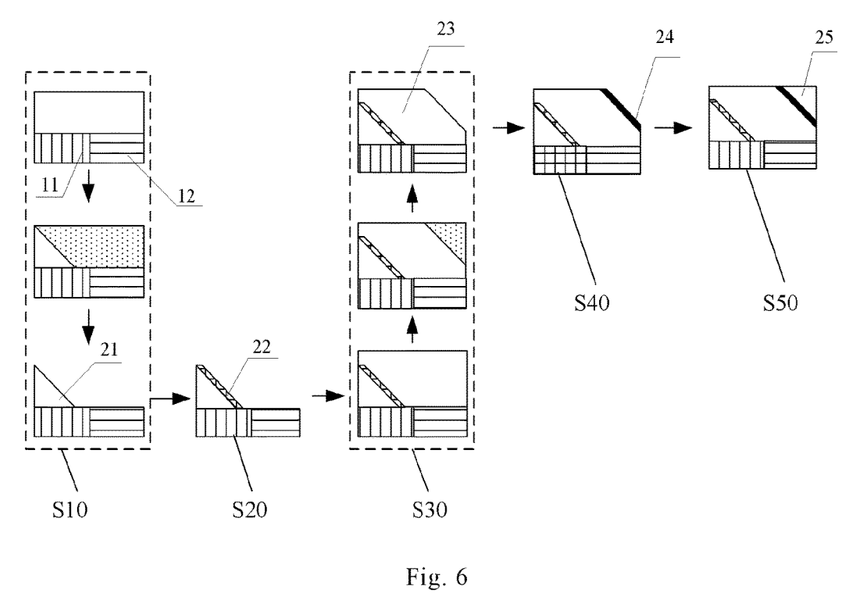
FIG. 6 is a flow chart of a method of manufacturing an optical device according to another embodiment of the present disclosure.

According to an embodiment of the present disclosure, referring to FIG. 5 and FIG. 6, the optical device 2 may be formed by lithographic process. In the embodiment, the step of forming the optical device 2 includes following steps:

Step S10: forming a first light transmissive layer 21 on a surface of the reflective region of the display substrate facing towards the backlight source. In practice, specifically, a rectangle transparent resin layer is formed to cover the surface, facing towards the backlight source 3, of the reflective region 12 of the display substrate 1, and then is exposed to light by using a mask, developed and peeled off, obtaining a first light transmissive layer 21 with desired structure and shape, for preparing for formation of the first reflective portion 22.

Step S20: manufacturing a reflective film layer on the first light transmissive layer 21, thereby forming the first reflective portion 22. Of course, a reflective film layer may be formed on a surface, facing towards the backlight source 3 of the reflective region 12 of the display substrate 1, such that the structure and shape of the reflective film layer meets actual requirement. That is, the first reflective portion 22 is directly formed on the surface of the reflective region 12 of the display substrate 1 without formation of the first light transmissive layer 21.

Step S30: forming the second light transmissive layer 23 on a surface of the reflective film layer such that the second light transmissive layer 23 covers the surface of the transmissive region 11 of the display substrate 1 facing towards the backlight source 3. Of course, the second light transmissive layer 23 may be formed on the surface of the transmissive region 11 of the display substrate 1 facing towards the backlight source 3 such that the second light transmissive layer 23 joins the reflective film layer, that is, a surface of the second light transmissive layer 23 covers the reflective face of the reflective film layer. In practice, a transparent resin layer is formed in a shape of inverted right-angle trapezium to cover on a surface of the reflective film layer and a surface of the transmissive region 11 of the display substrate 1 facing towards the backlight source 3. A lower surface of the transparent resin layer covers a surface of the transmissive region 11 of the display substrate 1 facing towards the backlight source 3 and an upper surface of the transparent resin layer is horizontal. An inclined side surface of the transparent resin layer covers the surface of the reflective film layer and then is exposed to light by using a mask, developed and peeled off. In this way, the second light transmissive layer 23 with desired structure and shape may be obtained, preparing for formation of the second reflective portion 24.

Step S40: manufacturing a one-way transmissive film layer on a portion, corresponding to the transmissive region 11 of the display substrate 1, of a surface of the light transmissive layer 23 such that a reflective face of the one-way transmissive film layer is opposite to the reflective face of the reflective film layer, thereby forming the second reflective portion 24.

Step S50: forming a third light transmissive layer 25 on a transmissive light-incident face of the one-way transmissive film layer such that a surface of the light transmissive layer 25 facing towards the backlight source 3 is parallel to the major surface of the display substrate 1. In practice, specifically, a flat transparent resin layer is formed to cover the transmissive light-incident face of the one-way transmissive film so as to ensure that an outer surface of the optical device 2 is flat, facilitating formation of other functional layers.

In the above steps S20 and S40 of the above embodiment, optionally, the first light transmissive layer 21 in a shape of right-angle triangle is formed on the surface of the reflective region 12 of the display substrate 1 facing towards the backlight source 3, such that a right angle face of the first light transmissive layer 21 joins the surface, facing towards the backlight source 3, of the reflective region 12 of the display substrate 1, the reflective film layer is formed on an inclined side surface of the first light transmissive layer 21 and the one-way transmissive film layer is formed to be parallel to the reflective film layer, thereby ensuring the second light beam from the backlight source 3 that irradiates to the reflective region 12 of the display substrate 1 may be reflected in a maximum amount as possible to the one-way transmissive film layer and is reflected by the one-way transmissive film layer to the transmissive region 11 of the display substrate 1. As an example, the reflective film layer is formed such that an included angle a is formed between the reflective film layer and the surface of the reflective region 12 of the display substrate 1 that faces the backlight source 3. The included angle a may be selected in such a range that the reflective film layer may reflect the second light beam to the one-way transmissive film layer. In an embodiment, the included angle a may be ranged from 30° to 60° so as to ensure the reflective film layer to reflect the second light beam as much as possible to the one-way transmissive film layer and thus increase light transmission of the transmissive region 11 of the display substrate 1.

Embodiments of the present disclosure further provide a semi-transmissive, semi-reflective display device including the semi-transmissive, semi-reflective display panel provided by any of the above embodiments. The semi-transmissive, semi-reflective display panel in the semi-transmissive, semi-reflective display device may achieve the same advantageous effects as those achieved by the semi-transmissive, semi-reflective display panel provided by the above embodiments, which are not repeatedly described herein.

The above description is merely intended for embodiments of the present disclosure, and the protective scope of the present disclosure is not limited to this. Any changes or replacements of the embodiments within the technical scope defined by the present disclosure obtained by the skilled in the art shall be covered by the scope of the present disclosure. The protective scope of the present disclosure is defined by the attached claims.

The invention claimed is:

1. A semi-transmissive, semi-reflective display panel, comprising a display substrate having a transmissive region and a reflective region,
wherein the semi-transmissive, semi-reflective display panel further comprises an optical device including a first reflective portion and a second reflective portion;
wherein the first reflective portion is configured to reflect light irradiating the reflective region of the display substrate from a backlight source to the second reflective portion; and
the second reflective portion is configured to transmit therethrough light irradiating the transmissive region of the display substrate from the backlight source and reflect light reflected from the first reflective portion to the transmissive region of the display substrate.

2. The semi-transmissive, semi-reflective display panel according to claim 1, wherein, the first reflective portion comprises a reflective film layer configured between the reflective region of the display substrate and the backlight source, and the second reflective portion comprises a one-way transmissive film layer configured between the transmissive region of the display substrate and the backlight source; wherein,
a reflective face of the one-way transmissive film layer faces towards the transmissive region of the display substrate and is opposite to a reflective face of the reflective film layer.

3. The semi-transmissive, semi-reflective display panel according to claim 2, wherein, the optical device comprises:
a first light transmissive layer configured between the reflective film layer and the reflective region of the display substrate; and
a second light transmissive layer configured in a region surrounded by the one-way transmissive film layer, the transmissive region of the display substrate and the reflective film layer.

4. The semi-transmissive, semi-reflective display panel according to claim 3, wherein, the optical device further comprises a third light transmissive layer configured on a transmissive light-incident face of the one-way transmissive film layer, a surface of the third light transmissive layer facing towards the backlight source being parallel to a major surface of the display substrate.

5. The semi-transmissive, semi-reflective display panel according to claim 4, wherein, the first light transmissive layer, the second light transmissive layer and the third light transmissive layer are each a light transmissive resin layer.

6. The semi-transmissive, semi-reflective display panel according to claim 3, wherein, the one-way transmissive film layer is configured to be parallel to the reflective film layer.

7. The semi-transmissive, semi-reflective display panel according to claim 2, wherein, an included angle is formed between the reflective film layer and a surface of the reflective region of the display substrate facing towards the backlight source and is ranged from 30° to 60°.

8. The semi-transmissive, semi-reflective display panel according to claim 6, wherein, an included angle is formed between the reflective film layer and a surface of the reflective region of the display substrate facing towards the backlight source and is ranged from 30° to 60°.

9. The semi-transmissive, semi-reflective display panel according to claim 1, further comprising a base substrate and a thin film transistor array formed on a surface of the base substrate, an insulating layer on the thin film transistor array, and a transparent pixel electrodes on a surface of the insulating layer, wherein a part of the pixel electrode is covered by the reflective electrode such that a part of the pixel electrode that is not covered by the reflective electrode is formed as a pixel electrode transmissive region, the transmissive region is located between the pixel electrode transmissive region and the base substrate, the part of the pixel electrode that is covered by the reflective electrodes is a pixel electrode reflective region, and a region between the pixel electrode reflective region and the based substrate is the reflective region of the display substrate.

10. The semi-transmissive, semi-reflective display panel according to claim 1, further comprising the backlight source, which includes a light source, a light guide plate and an optical film sheet.

11. A method of manufacturing the semi-transmissive, semi-reflective display panel according to claim 1, wherein the method comprises steps of:
forming the first reflective portion on a side of the reflective region of the display substrate facing towards the backlight source, and forming the second reflective portion on a side of the transmissive region of the display substrate facing towards the backlight source, the first reflective portion and the second reflective portion together forming the optical device; wherein,
the reflective portion is configured to reflect the light irradiating the reflective region of the display substrate from the backlight source to the second reflective portion; and
the second reflective portion is configured to transmit therethrough the light irradiating the transmissive region of the display substrate from the backlight source and reflect the light reflected from the first reflective portion to the transmissive region of the display substrate.

12. The method according to claim 11, wherein, the step of forming the first reflective portion comprises:
forming a reflective film layer on a surface of the reflective region of the display substrate facing towards the backlight source, thereby forming the first reflective portion; or
forming a first light transmissive layer on a surface of the reflective region of the display substrate facing towards the backlight source and manufacturing a reflective film layer on the first light transmissive layer, thereby forming the first reflective portion.

13. The method according to claim 12, wherein, the step of forming the second reflective portion comprises:
forming a second light transmissive layer on a surface of the transmissive region of the display substrate facing towards the backlight source, the second light transmissive layer joining the reflective film layer, and forming an one-way transmissive film layer on the second light transmissive layer, thereby forming the second reflective portion, a reflective face of the one-way transmissive film layer being opposite to a reflective face of the reflective film layer; or
forming a second light transmissive layer on a surface of the reflective film layer, the second light transmissive layer covering a surface of the transmissive region of the display substrate facing towards the backlight source, and forming the one-way transmissive film layer on a portion of a surface of the second light transmissive layer corresponding to the transmissive region of the display substrate, thereby forming the second reflective portion, a reflective face of the one-way transmissive film layer being opposite to a reflective face of the reflective film layer.

14. The method according to claim 13, wherein, the step of forming the second reflective portion further comprises:
   forming a third light transmissive layer on a transmissive light-incident face of the one-way transmissive film layer, a surface of the third light transmissive layer facing towards the backlight source being parallel to a major surface of the display substrate.

15. The method according to claim 13, wherein the one-way transmissive film layer is formed to be parallel to the reflective film layer.

16. The method according to claim 14, wherein the one-way transmissive film layer is formed to be parallel to the reflective film layer.

17. The method according to claim 15, wherein an included angle is formed between the reflective film layer and a surface of the reflective region of the display substrate facing towards the backlight source and is ranged from 30° to 60°.

18. The method according to claim 16, wherein an included angle is formed between the reflective film layer and a surface of the reflective region of the display substrate facing towards the backlight source and is ranged from 30° to 60°.

19. A semi-transmissive, semi-reflective display device comprising the semi-transmissive, semi-reflective display panel according to claim 1.

* * * * *